(12) United States Patent
Helfman et al.

(10) Patent No.: US 11,748,488 B2
(45) Date of Patent: Sep. 5, 2023

(54) INFORMATION SECURITY RISK MANAGEMENT

(71) Applicant: Sixgill Ltd., Tel Aviv (IL)

(72) Inventors: Nadav Binyamin Helfman, Binyamina (IL); Alex Marks-Bluth, Rehovot (IL); Omer Carmi, Tel-Aviv (IL); Ben Sterenson, RaAnana (IL)

(73) Assignee: Sixgill Ltd., Tel Aviv (IL)

( * ) Notice: Subject to any disclaimer, the term of this patent is extended or adjusted under 35 U.S.C. 154(b) by 168 days.

(21) Appl. No.: 17/131,878

(22) Filed: Dec. 23, 2020

(65) Prior Publication Data

US 2021/0192057 A1    Jun. 24, 2021

Related U.S. Application Data

(60) Provisional application No. 62/953,225, filed on Dec. 24, 2019.

(51) Int. Cl.
*G06F 21/57* (2013.01)
*H04L 9/40* (2022.01)

(52) U.S. Cl.
CPC ........ *G06F 21/577* (2013.01); *H04L 63/1408* (2013.01); *H04L 63/1433* (2013.01)

(58) Field of Classification Search
CPC .............. G06F 21/577; H04L 63/1408; H04L 63/1433
See application file for complete search history.

(56) References Cited

U.S. PATENT DOCUMENTS

| 9,871,815 | B2 |   | 1/2018  | Ouchn    |              |
|-----------|----|---|---------|----------|--------------|
| 11,232,383| B1 | * | 1/2022  | Burns, Sr. | G06Q 10/0637 |
| 2018/0316705 | A1 | * | 11/2018 | Tsironis | H04L 63/20 |
| 2022/0030009 | A1 | * | 1/2022 | Hasan | H04L 63/1491 |
| 2022/0050921 | A1 | * | 2/2022 | LaFever | H04L 63/0407 |
| 2022/0053016 | A1 | * | 2/2022 | Trost | H04L 63/1416 |
| 2022/0058747 | A1 | * | 2/2022 | Crabtree | G06Q 40/08 |
| 2022/0060512 | A1 | * | 2/2022 | Crabtree | H04L 63/1425 |

(Continued)

OTHER PUBLICATIONS

Jacobs et al. "Improving Vulnerability Remediation Through Better Exploit Prediction", Journal of Cybersecurity, 6(1): tyaa015-1-015-29, Published Online Sep. 14, 2020.

(Continued)

*Primary Examiner* — Stephen T Gundry

(57) ABSTRACT

A method, system and computer program product for facilitating risk mitigation of information security threats. Data obtained from at least one tracked data source is analyzed for identifying at least one event related to a threat, to be stored in a database comprising date and time of each event identified, enabling generation of threat timeline comprising temporally ordered sequence of each event related to respective threat identified. Features selected using correlation between features from threat timelines in the database and labeling assigned using records of threat usage incidents are extracted from events in threat timeline for the threat which the at least one event related thereto being identified and based thereon a dynamic score indicating an estimated level of risk posed by the threat is calculated using at least one machine learning model for predicting threat usage during a time window defined, enabling risk mitigation based on outputted indication thereof.

20 Claims, 9 Drawing Sheets

(56) References Cited

U.S. PATENT DOCUMENTS

| | | | |
|---|---|---|---|
| 2022/0067202 A1* | 3/2022 | Nedelec | G06F 21/6254 |
| 2022/0108026 A1* | 4/2022 | Ortiz | G06F 21/602 |
| 2022/0121731 A1* | 4/2022 | Groth | G06F 21/31 |
| 2022/0121884 A1* | 4/2022 | Zadeh | G06V 10/764 |
| 2022/0126864 A1* | 4/2022 | Moustafa | B60W 50/0098 |
| 2022/0138280 A1* | 5/2022 | Riggs | G06Q 40/06 |
| | | | 707/737 |
| 2022/0165143 A1* | 5/2022 | Pourmohammad | G06F 40/30 |
| 2022/0215102 A1* | 7/2022 | Shakarian | G06F 21/577 |
| 2022/0224707 A1* | 7/2022 | Kapoor | G06F 16/9038 |
| 2022/0224723 A1* | 7/2022 | Crabtree | G06F 16/951 |
| 2022/0229912 A1* | 7/2022 | Tavabi | H04L 63/1433 |
| 2022/0232024 A1* | 7/2022 | Kapoor | H04L 67/306 |
| 2022/0232025 A1* | 7/2022 | Kapoor | G06F 16/9024 |
| 2022/0247769 A1* | 8/2022 | Erlingsson | G06F 16/9024 |
| 2022/0255926 A1* | 8/2022 | Crabtree | H04L 63/1433 |

OTHER PUBLICATIONS

Sarkar et al. "Predicting Enterprise Cyber Incidents Using Social Network Analysis on the Darkweb Hacker Forums", The Cyber Defense Review, Special Edition: International Conference on Cyber Conflict, CYCON U.S., Nov. 14-15, 2018: Cyber Conflict During Competition, p. 87-102, 2019.

* cited by examiner

```
{
   "_id" :
Objectid("5e4ecd4918lae13546e8392"),
   "site_rate" : 5.0,
   "description" : "Mentioned on forum vor
(highly regarded source with rank 5.0 -
6.487749) on forum exploit entry817956",
   "cve_id" : "CVE-2015-3119",
   "site" : "forum_vor",
   "actor" : "INC.",
   "actor_rank" : 7.791475,
   "action" : "added",
   "elastic_id" :
"21a2ba1a460ee316289f952e53bf82be43204248",
   "type" : "site_mention",
   "class" : "MentionByHighRatedSite",
   "event_datetime" : ISODate("2019-11-
11T09:18:00.000Z")
},
{
   "_id" :
Objectid("5e4ef2951ae13546e9304"),
   "description" : "Mentioned by
zloy_santa (highly regarded actor with rank
6.487749) on forum exploit entry817956",
   "cve_id" : "CVE-2017-0199",
   "site" : "forum_exploit",
   "actor" : "zloy_santa",
   "actor_rank" : 6.487749,
   "action" : "added",
   "elastic_id" : "entry817956",
   "type" : "actor_mention",
   "class" : "MentionByHighRatedActor",
   "event_datetime" : ISODate("2017-10-
25T12:27:00.000Z")
},
```

```
{
   "_id" :
Objectid("5eccb4c2b5c2d61025c285e"),
   "description" : "Mentioned in connection
to an exploit (\"exploit kit\") exploit on
forum_pediy
0bd2c2b2f88bdf1650i1adf0e7a72ce1efa88f5d",
   "cve_id" : "CVE-2019-3396",
   "site" : "forum_pediy",
   "actor_rank" : 5,
   "actor" : "深漏源千里目",
   "action" : "added",
   "elastic_id" :
"0bd2c2b2f88bdf16301adf0e7a72ce1efa88f5d",
   "type" : "exploit_mention",
   "class" : "MentionExploitKeywords",
   "event_datetime" : ISODate("2019-11-
13T11:27:00.000Z")
},
{
   "_id" :
Objectid("5e4e8cc91815e100a6e3c6b9"),
   "description" : "Related Github repos -
significant increase in commits",
   "cve_id" : "CVE-2019-3396",
   "action" : "trend",
   "type" : "github_authoring",
   "class" : "GitHubAuthoringTrend",
   "event_datetime" : ISODate("2019-07-
02T00:00:00.000Z")
},
```

```
{
   "_id" : Objectid("5ecd07ebd28fec0f4bc9b725"),
   "detection_date" : "2019-08-
12T09:20:44.749Z",
   "description" : "Related Github repos - 1 new
forks, https://github.com/Ytig3r/CVE-2019-3396_EXP",
   "cve_id" : "CVE-2019-3396",
   "forks_count_delta" : 1,
   "html_url" : "https://github.com/Ytig3r/CVE-2019-
3396_EXP",
   "new_forks_count" : 54,
   "event_datetime" : ISODate("2019-08-
12T09:20:44.749Z"),
   "action" : "modified",
   "type" : "github_repos",
   "class" : "GitHubNewForksEvent",
   "old_forks_count" : 53
},
{
   "_id" : Objectid("5e52644218lae16f34c1ff55"),
   "cve_last_modified_date" : "2019-03-01T13:012",
   "description" : "NVD impact baseScore changed
from 5.0 to 6.4",
   "cve_id" : "CVE-2018-0496",
   "cve_published_date" : "2018-06-12T20:29Z",
   "old_base_score" : 5.0,
   "detection_date" : ISODate("2019-03-
02T08:30:42.723Z"),
   "action" : "modified",
   "new_base_score" : 6.4,
   "type" : "nvd",
   "class" : "NvdImpactIncrease",
   "event_datetime" : ISODate("2019-03-
01T13:01:00.000Z")
} ]
```

FIG. 4

| Threat_id | Date | Mention By High Rated Site [previous 90 days events count] | Mention By High Rated Actor [previous 90 days events count] | Mention Exploit Keywords [previous 90 days events count] | GitHub Authoring Trend [previous 90 days events count] | GitHub New Forks Event [previous 90 days events count] | Exploit Incident [14 days past Date to 70 days after date count] |
|---|---|---|---|---|---|---|---|
| CVE-2016-3298 | 2017-02-19 | 3 | 0 | 2 | 0 | 0 | 0 |
| CVE-2015-5119 | 2015-10-29 | 4 | 3 | 1 | 1 | 0 | 0 |
| CVE-2017-0199 | 2017-10-14 | 182 | 73 | 0 | 5 | 0 | 1 |
| CVE-2017-0199 | 2017-10-14 | 184 | 74 | 0 | 5 | 0 | 1 |
| CVE-2019-9978 | 2019-07-02 | 8 | 4 | 0 | 2 | 0 | 1 |
| CVE-2019-0199 | 2019-07-22 | 162 | 68 | 0 | 2 | 0 | 2 |
| CVE-2019-3396 | 2019-07-01 | 18 | 25 | 4 | 3 | 27 | 2 |

FIG. 8

INFORMATION SECURITY RISK MANAGEMENT

RELATED APPLICATION

This application claims the benefit of priority under 35 USC § 119(e) of U.S. Provisional Patent Application No. 62/953,225 filed on Dec. 24, 2019, the contents of which are incorporated herein by reference in their entirety.

FIELD AND BACKGROUND OF THE INVENTION

Some embodiments described in the present disclosure relate to information security and, more specifically, but not exclusively, to facilitating risk mitigation of information security threats.

Computer systems control and facilitate many aspects of human life, from text editing to infrastructure resource management such as power plants and traffic lights. Network communications often used by, and in some cases even essential to basic functioning of many computer systems, also make such systems susceptible to information security threats such as cyber-attacks, i.e. deliberate attempts to gain unauthorized access to or harm proper operation of the system and/or any of its resources, carried out via a computer network and/or communication network connection. Such attacks may cause serious damages in monetary loss, and in extreme cases even result in personal injury, e.g. when targeted against automotive systems and/or the like.

Types of threats or attack routes include vulnerabilities and/or exposures in software and/or hardware components that may be exploited for malicious activity, as well as malicious software ("malware") being intentionally designed to malicious functions, e.g. causing damage or disruption and the like.

SUMMARY OF THE INVENTION

It is an object of the present disclosure to describe a system and a method for facilitating risk mitigation of information security threats.

The foregoing and other objects are achieved by the features of the independent claims. Further implementation forms are apparent from the dependent claims, the description and the figures.

According to one aspect, there is provided a method for facilitating risk mitigation of information security threats, comprising: analyzing data obtained from at least one tracked data source for identifying at least one event related to a threat; storing the at least one event in a database comprising for each threat and each event identified as related to the threat a date and time of the event, whereby generation of a threat timeline comprising temporally ordered sequence of each identified event related to a respective threat being enabled; extracting from events in threat timeline generated for the threat which the at least one event related thereto being identified a plurality of features selected using a correlation between features extracted from a plurality of threat timelines stored in the database and labeling assigned using a plurality of incident records each documenting a threat usage incident; calculating based on the plurality of features extracted a dynamic score indicating an estimated level of risk posed by the threat using at least one machine learning model configured for providing prediction of threat usage during a time window defined; and outputting an indication of the dynamic score based on which risk mitigation according to the estimated level of risk being enabled.

According to another aspect, there is provided a system facilitating risk mitigation of information security threats, comprising: a processing circuitry adapted to execute a code for: analyzing data obtained from at least one tracked data source for identifying at least one event related to a threat; storing the at least one event in a database comprising for each threat and each event identified as related to the threat a date and time of the event, whereby generation of a threat timeline comprising temporally ordered sequence of each identified event related to a respective threat being enabled; extracting from events in threat timeline generated for the threat which the at least one event related thereto being identified a plurality of features selected using a correlation between features extracted from a plurality of threat timelines stored in the database and labeling assigned using a plurality of incident records each documenting a threat usage incident; calculating based on the plurality of features extracted a dynamic score indicating an estimated level of risk posed by the threat using at least one machine learning model configured for providing prediction of threat usage during a time window defined; and outputting an indication of the dynamic score based on which risk mitigation according to the estimated level of risk being enabled.

According to yet another aspect, there is provided a computer program product for facilitating risk mitigation of information security threats, comprising: a non-transitory computer readable storage medium; program instructions for executing, by a processor, a method comprising: analyzing data obtained from at least one tracked data source for identifying at least one event related to a threat; storing the at least one event in a database comprising for each threat and each event identified as related to the threat a date and time of the event, whereby generation of a threat timeline comprising temporally ordered sequence of each identified event related to a respective threat being enabled; extracting from events in threat timeline generated for the threat which the at least one event related thereto being identified a plurality of features selected using a correlation between features extracted from a plurality of threat timelines stored in the database and labeling assigned using a plurality of incident records each documenting a threat usage incident; calculating based on the plurality of features extracted a dynamic score indicating an estimated level of risk posed by the threat using at least one machine learning model configured for providing prediction of threat usage during a time window defined; and outputting an indication of the dynamic score based on which risk mitigation according to the estimated level of risk being enabled.

Optionally, the features being extracted from the plurality of threat timelines according to an event classification defined.

Optionally, the at least one machine learning model being trained using a training set constructed using the plurality of incident records.

Optionally, for at least one record of the plurality of incident records documenting a threat usage incident, a time window in which the threat usage incident occurred being determined, and the database being sampled for obtaining and adding to the training set construction at least one threat timeline of a threat which being mapped based thereon to an adjacent non-overlapping time window relative to the time window determined.

Optionally, the dynamic score being calculated using a plurality of machine learning models each being configured for providing prediction of threat usage during a different time window defined.

Optionally, analyzing data for identifying the at least one event comprising: generating and storing at least one change record based on identified new or modified information item in the at least one tracked data source; and processing the at least one change record according to a defined set of rules for extracting event information therefrom.

Optionally, the at least one tracked data source being selected from the group consisting of: a threats directory; a threats updates feed; a threats database; a code repository; an exploit records collection; a threat-related text items collection; a sites collection; an actors collection.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 4 is a JSON format representation of exemplary event data structures;

FIG. 8 is a table of exemplary extracted features and labels;

DESCRIPTION OF SPECIFIC EMBODIMENTS OF THE INVENTION

Figure 1:
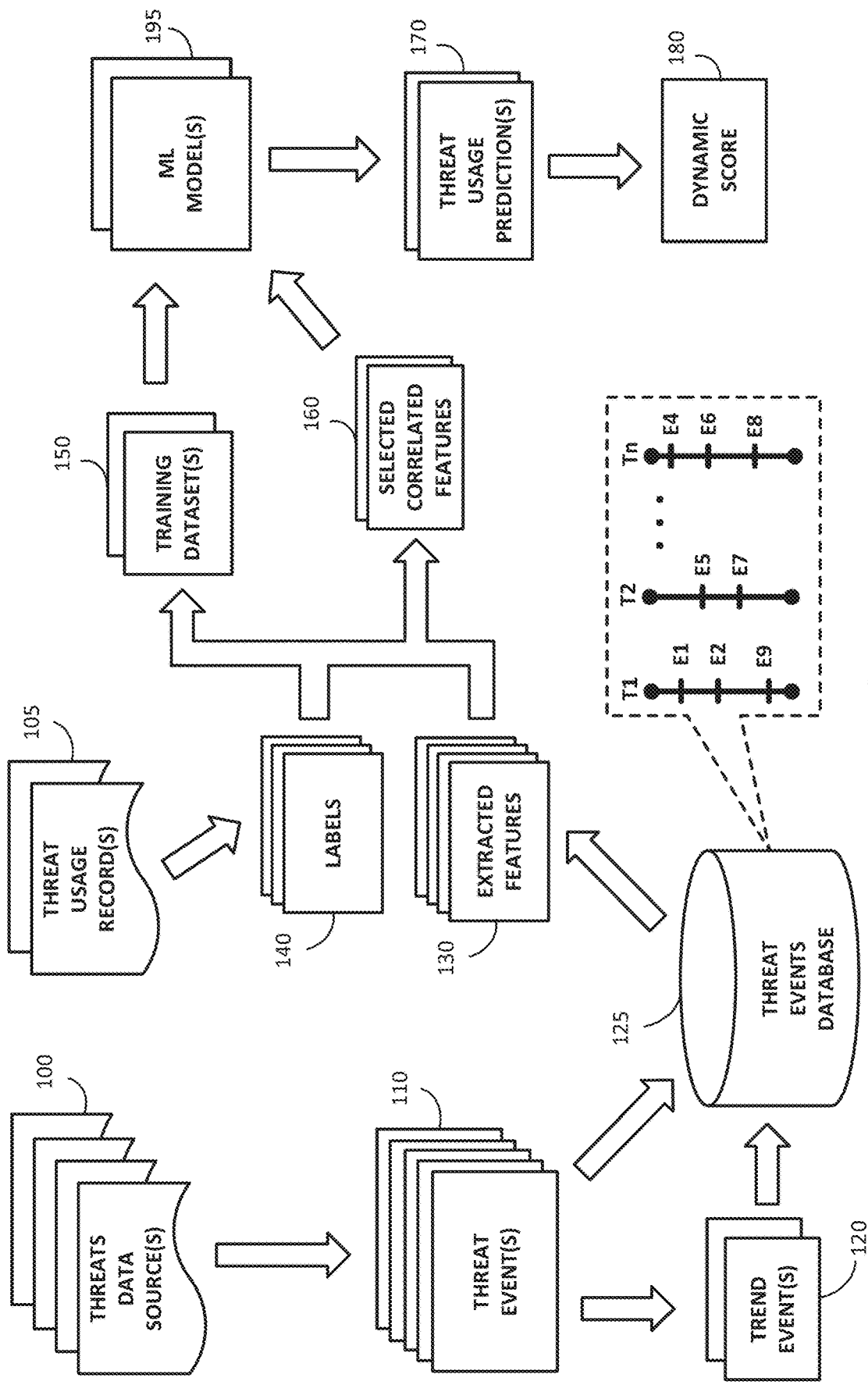
FIG. 1 is a schematic illustration of an exemplary flow of operations for dynamic scoring of information security threats.

Some embodiments described in the present disclosure relate to information security and, more specifically, but not exclusively, to facilitating risk mitigation of information security threats.

Defending against information security threats may be resource consuming task, requiring large number of person-hours and skilled workforce of security analysts and/or experts, information technology professionals and/or the like, in order to provide counter measures such as fixing or patching an exploit, for example. In many real-world scenarios and practical applications, such fix or protection measure deployment may require partial or complete shutdown of production systems and/or essential services, therefore there may be great importance and value in keeping such downtimes to as minimum as possible by addressing threats only if and when necessary.

However, deciding which threats have to be dealt with and at what urgency only becomes more and more intractable challenge as the number of threats grows larger and larger over time, for example, the number of threats identified in the "Common Vulnerabilities and Exposures" (CVEs) directory, published and maintained by MITRE organization, increased from 6,447 in 2016 to 16,555 in 2018, and year-over-year malware volume increase estimated as 64% by 2019.

According to some embodiments, one or more data sources relating to information security threats may be tracked and data obtained therefrom may be analyzed to identify at least one threat related event. The identified event may be stored in a database comprising for each threat and each event identified as related thereto a date and time of the event. Using the recorded date and time of each stored event relating to a threat, a threat timeline may be generated wherein identified events may be ordered temporally in a sequence. Extraction of selected features from events in the threat timeline generated may be performed based on correlation between features of threat timelines in the database and labels assigned using records documenting threat usage incidents. The extracted features may be provided to at least one machine learning model, configured for providing based thereon prediction of threat usage with respect to a defined time window, which may be used for calculation of a dynamic score indicating an estimated level of risk posed by the threat. An indication of the dynamic score may be outputted and facilitate risk mitigation based on the estimated level of risk reflected in the dynamic score. For example, threats may be handled in a prioritized manner according to the estimated risk level posed thereby.

The tracked data sources may comprise one or more data sources comprising structured data relating to information security threats, for example, a collection of threat-related structured documents. Additionally or alternatively, the tracked data sources may comprise one or more unstructured data sources relating to information security threats.

The structured data sources being tracked may comprise at least one threats directory service or data source, such as for example the CVEs directory by MITRE, comprising unique identifier for each threat, directories provided and managed by vendors of commercially available anti-malware protection products, such as for example Symantec directory in www(dot)Symantec(dot)com/security-center/a- z, Kaspersky directory in threats(dot)kaspersky(dot)com/en/threat and/or the like, and/or any likewise threats directory services and/or data sources.

Additionally or alternatively, the structured data sources may comprise at least one extended information and scoring source, such as for example the National Vulnerability Database (NVD), which is a U.S. government repository of standards-based vulnerability management data that provides score for most known vulnerabilities using the Common Vulnerability Scoring System (CVSS), and/or any other likewise extended information and scoring sources. Such sources may be used for obtaining meta information regarding risk scoring, applicability to computing environments, and/or the like, enabling users understanding context of a threat, as identified for example by unique identifier thereof specified in threats directory and/or the like.

Additionally or alternatively, the structured data sources may comprise at least one code repository service or data source managing and sharing source codes related to threats, such as for example, a code that exploits a threat or a code that assists in detecting a threat or protecting against it. Optionally the at least one code repository service or data source may be implemented on top of code configuration management system, such as Git and/or the like. Optionally the code repository may comprise "proof of concept" projects from websites such as, for example, GitHub and/or the like.

Additionally or alternatively, the structured data sources may comprise at least one exploit records service or data source comprising records regarding exploits that take advantage of threats. Exploit records may be published in websites such as, for example, exploit-db(dot)com and/or the like.

The unstructured data sources being tracked may comprise at least one collection of threats mentions comprising text items in which threats may be mentioned throughout the web, such as for example historical and/or current items extracted from online forums, social media platforms and/or the like, in the dark and/or the clear web.

Optionally the at least one collection of threats mentions may be coupled to a knowledge base retaining data and analytics of sites and actors responsible for content distributed online (i.e. persons and/or automated processes that authored or posted the content), thereby enabling determination of a ranking of each such identified site or actor according to defined quality measures. Site ranking may be based for example on volume, content classification, expert reviews and/or the like. Actors ranking may be based for example on frequency and/or recency of actor activity, such as for example authoring items, responding to items, getting responses from other actors in a forum or social media site, and/or the like. The ranking determined using the knowledge base may be used in processing of corresponding items in the mentions collection, such as for example based on ranking of a mentioning actor, ranking of a site where a mention occurred, and/or the like. Additionally or alternatively, individual items may be ranked, for example, based on quality and quantity of replies and/or other feedback from a community of users in forum web sites and/or social platforms and/or the like.

In some embodiments, analysis and/or processing of data of the at least one tracked data source for identification of threat-related events may comprise tracking creation, modification and deletion of documents or information items in each collection of structured data being tracked. Optionally different versions of tracked documents may be retrieved from structured data sources being tracked, along with respective time tags for each creation, update and/or deletion detected. Each tracked data source or data collection type may be associated with a database for storing change records documenting each a change detected in the respective tracked data source. A change record may comprise document versions preceding and following a change detected and a timestamp or date and time tag of the change.

Optionally change records may be categorized as either "added" or "modified" (edited or removed) in accordance with the change type, i.e. new or edited/deleted documents respectively. Optionally change records corresponding to document modification changes detected may comprise in-document path, original and updated value for each modified item of the structured document, and/or likewise change-related information. Optionally threat related documents stored in change records may be enriched with additional information and/or attributes obtained from other documents and/or from calculated fields. For example, a document describing a GitHub repository may be enriched with a list of all repository files that mention an identifier of the respective threat (threat ID). Detection of changes in tracked data sources and generation of change records according thereto may be performed in a continuous manner and/or on demand, e.g. per periodically scheduled tasks.

Optionally change records generated for tracked data source may be stored in respective database associated therewith and processed using a set of event rules defined therefor. Each event rule may comprise a query and formatting of conversion of matched results returned for the query into corresponding event data structure. The events obtained from the change records may be stored in the threat events database.

Similarly, mention events of different types may optionally be identified and/or generated from text items in tracked unstructured data source(s). Generated mention event(s) may be based on ranking of mentioning actor, ranking of website in which mentioning occurred, keywords appearance in mentioning text item, classification of mentioning item, and/or the like. The events obtained from mention collection(s) may be stored in the threat events database.

It will be appreciated that threats may be assessed and scored based on multiple criteria. One criterion may be a prediction of a likelihood that a threat may take part in exploit incidents of real organizations or entities. For such a prediction, records of real exploit incidents, also referred to herein as "threat usage records", may be used. Each exploit incident record may comprise at least a date and time tag corresponding to estimated actual exploit date, and an association to a threat identifier. Optionally the record may further comprise link(s) to publication(s) of the exploit incident, identification of exploited organization(s) or entity(ies), general description, and/or any likewise threat-related information. As existence of exploit incidents may be often confidential, available records of exploit incidents and/or list thereof may likely be partial, and may be obtained using intelligence activities and/or collaboration with cyber related organizations, for example.

Prediction of threat usage or exploit incident may be performed using one or more machine learning model(s) which may be complementary of one another and/or which multiple scoring obtained therefrom may be integrated together into a single score. The machine learning models may be trained using features extracted from events in threat timelines and labels assigned using threat usage records. Optionally threats may be scored with respect to particular point in time and/or time interval(s) defined, e.g. per hour, day, week, month, etc. and/or per any number of hours, days, weeks, months and so forth, and/or at dates and/or times defined, e.g. at a first day of each month, every weekend at midnight, and/or the like.

Dynamic scoring of threats may be obtained by performing on-going assessment of threats, in form of a numerical score, using the trained machine learning models and extracted features from events in threat timeline(s) for predicting threat usage likelihood within a time window defined.

As an illustrative example, one of machine learning model(s) may score a threat based on a prediction whether the threat being expected to be exploited in an exploit incident recently (e.g., over the past 2 weeks) and/or within the next 10 weeks. Similarly, another one of machine learning model(s) may score the threat based on prediction whether the threat ever been used in an exploit incident in the past. The scores may be integrated, e.g., by applying a function, such as for example, weighted average of the scores provided by each of machine learning model(s) and the result may optionally be further calibrated into a range of [0,1], [0,10] and/or the like using, for example, a sigmoid function.

In the example herein, the threat may be scored by the first model based on a prediction whether the threat being just, or expected to be exploited as part of an exploit incident, e.g. in an organization. The prediction may address dates within time range of e.g. 2 weeks before date of prediction to 10 weeks after date of prediction. The prediction may be performed using flow of events identified as related to the threat and stored in database, starting from e.g. 90 days prior to date of prediction. Features may be generated from events in the time range defined, for example by computing, for each threat, date of prediction and event class defined, a total count of matching events within the time range. Similarly, features for the second model by which the threat may be scored based on a prediction of whether the threat ever been used, may be generated in a same manner and by further converting each count for each class of events to a count of all and/or any usage of the threat ever since earliest reported incident and/or first detection thereof.

In addition, labels for the first and/or second model may be generated using threat usage records. For example, when generated for the first model, label for date of prediction may be true or false based on existence of dated exploit record addressing the threat within the period defined, e.g., starting from 2 weeks prior to the date of prediction and continuing until 10 weeks following the labeled date. Similarly, when generated for the second model, the label may be true or false based on existence of at least one exploit incident record. Alternatively, labels for the first and/or second model may be a count of exploit incidents documented in the plurality of exploit records, namely, 0, 1, and/or even 2, 3, and so forth.

Optionally, the concluded features from events and labels from exploit incidents records may be correlated and a subset of features may be selected based on the correlation value, for example by excluding features with correlation value under predefined threshold.

The following are exemplary lists of events related to CVE and/or malware threats that may be generated out of all tracked data sources as discussed herein.

List A:
CVE mentioned by actor rated 'High'.
General mentions of the CVE in 'clear web'.
Mention of the CVE in dark site(s) together with exploit terms.
Mention of the CVE in dark site(s) rated 'High'.
Mentions of the CVE in an item scored high based on feedback from the community.
A GitHub repository with Proof of Concept (POC) code being watched.
An exploit code for the CVE published in exploit database sites.
A new GitHub repository with POC code for the CVE created.
A GitHub repository with POC code forked (copied aside) into another GitHub repository.
There is a general trend of authoring repositories with POC code for the CVE in GitHub.
The CVE re-evaluated by NVD and CVSS score increased.
A new reference, tagged as "Patch" added to references section of the CVE record in NVD.

List B:
Malware mentioned by actor rated 'High'.
General mentions of the Malware in 'clear web'.
Mentions of the Malware in dark site(s) together with exploit terms.
Mentions of the Malware in dark site(s) rated 'High'.
A GitHub repository being watched.
A new GitHub repository with a code that utilizes the Malware created.
GitHub repository forked aside (copied aside).
Trend of authoring repositories code for the Malware in GitHub.
The Malware re-evaluated by anti-malware vendor.

Each of the events in List A and/or in List B may be converted into features per each day or prediction date for which scoring may be sought. Label per each day or date of prediction may be assigned using threat usage records and/or exploit incidents list, documenting real exploit incidents in organizations and/or other entities and comprising for each threat at least an identifier and estimated date in which the exploit took place. The label value may be 1 if an exploit, retrospectively when processed on historical data, may take place within predefined time interval after the labeled date, e.g. in the next 90 days succeeding thereto, and 0 otherwise, i.e. the label may be assigned based on whether the actual incident occurred within the defined range from a prediction date preceding it.

It will be appreciated that threat intelligence dynamic score computed in accordance with the disclosed subject matter based on multi source intelligence events, may be used either by humans and/or systems to make decisions with potential significant business and/or operational costs regarding mitigation of risks and/or prioritization thereof, e.g. based on their eminence as reflected in the scoring.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of an exemplary flow of operations for dynamic scoring of information security threats.

As shown in FIG. 1, one or more threat data source(s) 100 may be tracked and threat-related data obtained therefrom may be analyzed for identifying threat event(s) 110. Optionally threat event(s) 110 identified in data of threat data source(s) 100 may be analyzed for identifying trend event(s) 120, such as analytics and/or aggregated data of threat event(s) 110. For example, flow of threat event(s) 110 may be processed into trend event(s) 120 wherein time series analysis may be applied to detect anomalies and/or directional changes in the events flow and report them as additional events. Each of identified threat event(s) 110 and trend event(s) 120 may be stored in threat events database 125 along with respective date and time tag or timestamp. Optionally each event entry may comprise association to a threat identifier, event class identifier, event class specific additional attributes as applicable, description in human readable text representation of alert class and attributes, and/or any likewise descriptive identification information and attributes. For each particular threat in database 125 any and all associated stored threat event(s) 110 and/or trend event(s) 120 identified as related thereto may be ordered temporally in a sequence to form a threat timeline of threat-related events.

Extracted features 130 may be obtained from events stored in database 125 and corresponding labels 140 may be obtained from threat usage record(s) 105 wherein at least one threat usage incident may be documented. Extracted features 130 labels 140 may be used for constructing one or more training dataset(s) 150 for training one or more machine learning (ML) model(s) 195. Extracted features 130 labels 140 may be correlated and results of correlation between extracted features 130 and labels 140 may be used in selection of selected correlated features 160. ML model(s) 195 may be applied to selected correlated features 160 for obtaining one or more threat usage prediction(s) 170. Using threat usage prediction(s) 170 dynamic score 180 may be calculated.

Figure 2:
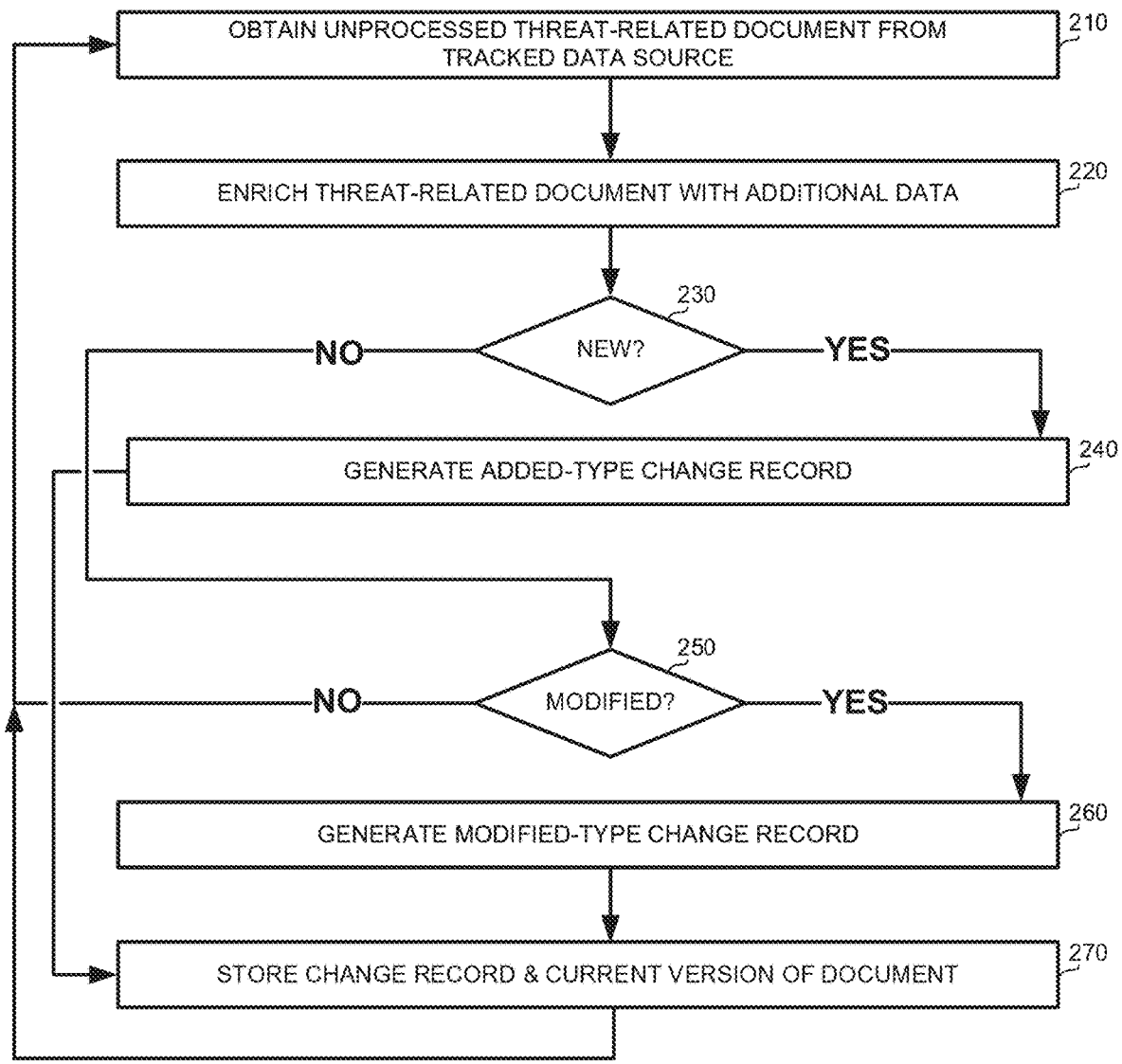
FIG. 2 is a flowchart diagram of a method for generating change record of structured document in tracked data source.

Reference is now made to FIG. 2, which is a flowchart diagram of a method for generating change record of structured document in tracked data source.

At 210 an unprocessed threat-related structured document may be extracted or obtained from examined tracked data source, such as threat data source(s) 100 of FIG. 1. At 220, the threat-related document obtained at 210 may be enriched with additional data, such as for example attributes from other documents and/or from calculated fields, optionally obtained using same and/or other tracked data source(s). To illustrate, an example for enrichment may be, a document describing a GitHub repository being enriched with a list of all repository files that mention a same threat ID.

At 230 determination as to whether the document obtained at 210 and/or 220 being new may be made. At 240 responsive to the document being new an added-type change record may be generated and the procedure may progress to 270. Otherwise at 250 determination as to whether the document being modified version of previously existing document may be made. At 260 responsive to the document being modified a modified-type change record may be generated. At 270 the change record generated at 240 or 260 along with current version of the threat-related document may be stored in a database associated with the tracked data source being processed. The procedure may go back to 210 and repeated until no unprocessed documents remaining in the collection or data source being processed.

Figure 3:
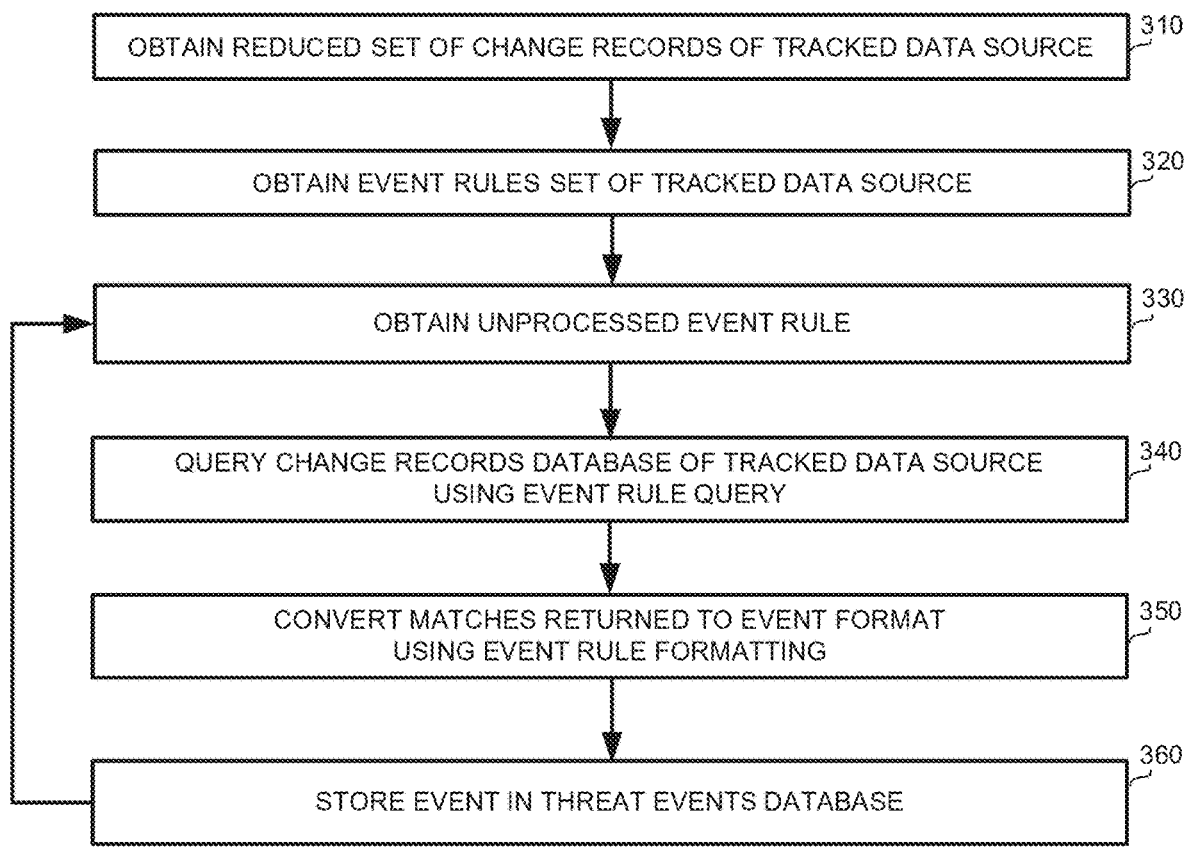
FIG. 3 is a flowchart diagram of a method for events extraction from change records.

Reference is now made to FIG. 3, which is a flowchart diagram of a method for events extraction from change records. Reference is also made to FIG. 4, which is a JSON format representation of exemplary event data structures.

At 310 a reduced set of change records of tracked data source may be obtained, for example by analyzing change records generated using procedure such as in FIG. 2, and selecting only change records of relevance to threat usage likelihood, i.e., relating to or informative of a chance or probability that a threat being or may be used at present or future time. Optionally expert users may be prompted to suggest selection of change records and/or related events meeting criteria defined. Alternatively, selection of change records and/or event types may be automated fully or partially. Suggestions or selections of change records and/or events may be validated using correlation with threat usage records of exploit incidents such as 105 of FIG. 1, optionally in addition to and/or in lieu of correlation with other threat events such as 110 of FIG. 1, until an adequate set of change records and/or events or event types may be elected. Alternatively, all change records or different change records types may be correlated with labels from threat usage records and subset of highly matching change records and/or events obtained thereby may be further analyzed for determining event types or rules in conformity with underlying reasoning inferred from such matched events. Optionally the reduced set of change records may be stored in associated database of the tracked data source in substitution of change records originally stored therein.

At 320 a set of event rules defined for the tracked data source may be obtained. Each event rule or event type in the set may comprise a query on corresponding change records collected for the tracked data source, and formatting of returned results for conversion thereof into event structured datatype, such as exemplary event data structures depicted in FIG. 4. Optionally event rules may further comprise enrichment, namely, fields to be added to target event data structure, with fields from other tracked document(s) and/or data source(s) as may be applicable for the event.

Referring back to FIG. 3, at 330 an unprocessed event rule from the set obtained at 320 may be obtained. At 340 corresponding change records collection or database of the tracked data source may be queried using query of the event rule obtained at 330 for obtaining returned matching results. At 350 format conversion of matches returned from change records database in response to the query at 340 may be performed using event formatting function or logic of the event rule obtained at 330, thereby an event data structure such as exemplified in FIG. 4 may be obtained.

Referring back to FIG. 3, at 360 the formatted matched event obtained at 350 may be stored in threat events database such as 125 of FIG. 1. The procedure may be reiterated from 330 to 360 until no unprocessed event rules in the set obtained at 320 remain.

Figure 5:
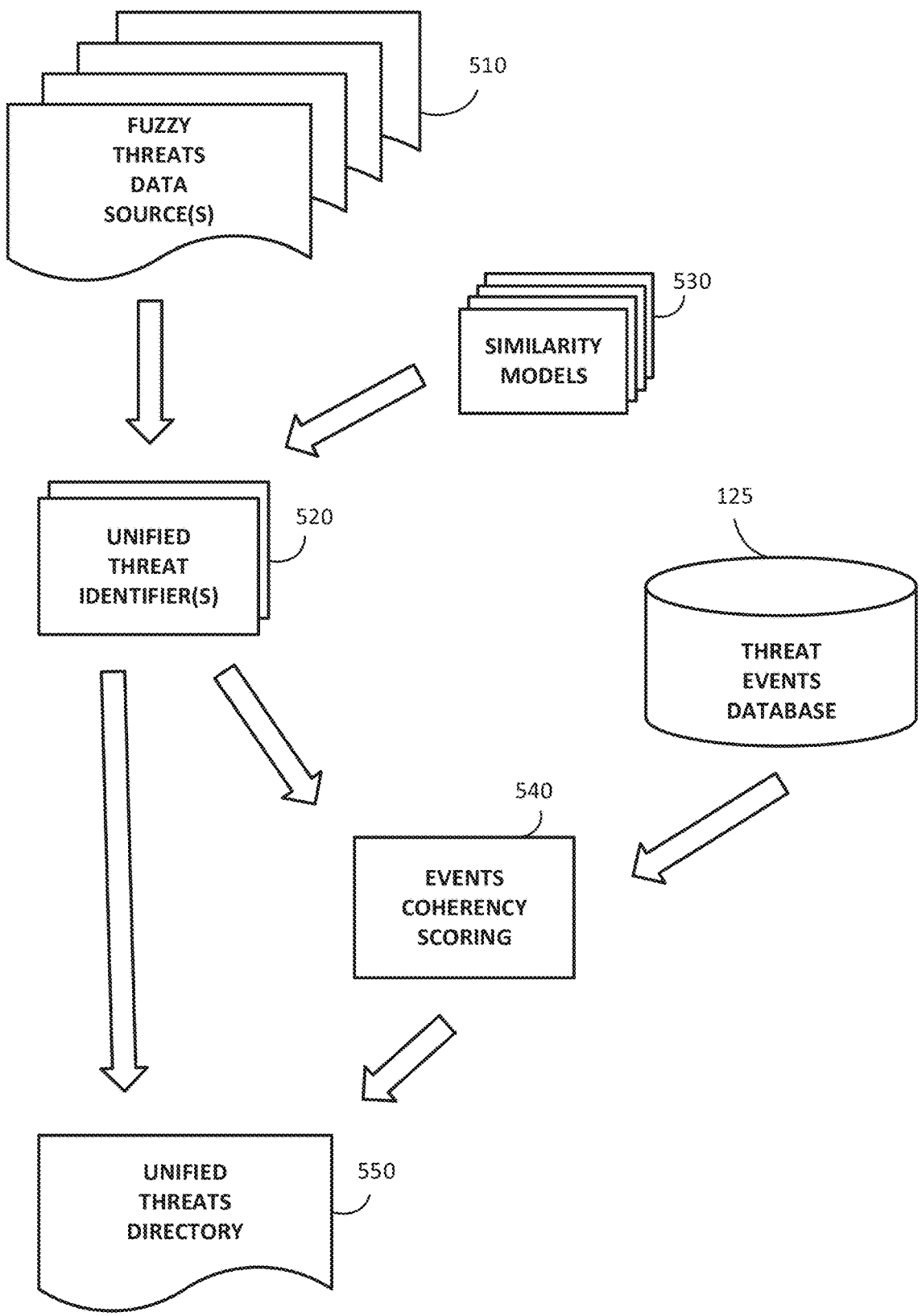
FIG. 5 is a schematic illustration of an exemplary flow of operations for unified threats directory construction.

Reference is now made to FIG. 5, which is a schematic illustration of an exemplary flow of operations for unified threats directory construction.

In contrast to threats such as CVEs for which there may be unique identifier accepted by related communities, such as CVE ID assigned by MITRE organization in form of "CVE-{YEAR}-{INDEX}", with regard to some other threat types, such as malware for example, there may be fuzziness regarding the identification thereof. For example, such threat may have different nicknames in different communities, code behind such threat may evolve into other threats with differences and similarities, and/or the like. For such cases, the disclosed subject matter may be utilized for self-generation of unique identifiers catalog of threats using exemplary process such as depicted in FIG. 5 and described herein.

One or more fuzzy threats data source(s) 510, comprising threat-related data which may potentially be not consistent internally and or across different individual sources, may be tracked and data obtained therefrom may be analyzed for determining one or more identifications of threats. Fuzzy threats data source(s) 510 may comprise for example malware identification systems and/or catalogs managed by anti-malware vendors, such as Symantec catalog in www(dot)Symantec(dot)com/security-center/a-z, Kaspersky catalog in threats(dot)Kaspersky(dot)com/en/threat/, and/or the like. Optionally fuzzy threats data source(s) 510 may comprise additional malware-related data sources provided by anti-malware providers such as meta information and classification as provided by Kaspersky in www(dot)Kaspersky(dot)com/resource-center/threats/malware-classifications, and/or the like.

Fuzzy threats data source(s) 510 may optionally comprise code repositories such as GitHub and/or the like wherein malware may reside as a source or binary code similarly as any other computer software. Optionally fuzzy threats data source(s) 510 may further comprise social platforms and/or online forums or likewise websites in clear web such as Twitter and/or in dark web such as "forum_exploit", "Forum_0day", "forum_FreeHacks", and/or the like, wherein traces of malware such as different nicknames thereof and/or the like may be discussed.

Mapping between different identifications of each threat into one of unified threat identifier(s) 520 may be determined and/or hypothesized, optionally using similarity model(s) 530 which may be based on sequence of events assumed to be related to threat identifier and/or extracted contextual data, such as joint occurrence e.g. in descriptive text or the like, encompassing content, nicknames similarity, binding items possibly related to different nicknames, and/or the like. Optionally threats identification may be performed iteratively and/or incorporate expert judgments when applicable.

Quality of mapping generated may be verified using events coherency scoring 540 which may be determined using threat events database 125 constructed similarly as n FIG. 1, by analyzing for each of unified threat identifier(s) 520 how 'typical' the threat timeline generated for the threat may be considered, i.e. occurrence likelihood of flow of events relating to the identified threat, with respect to an entire population of threat timelines stored in threat events database 125 or a sub-population with same or similar traits. Unified threat identifier(s) 520 for which mapping quality exceeds predetermined threshold may be stored in unified threats directory 550. Optionally unified threats directory 550 may be tracked in addition to or in lieu of threats data source(s) 100 of FIG. 1.

Figure 6:
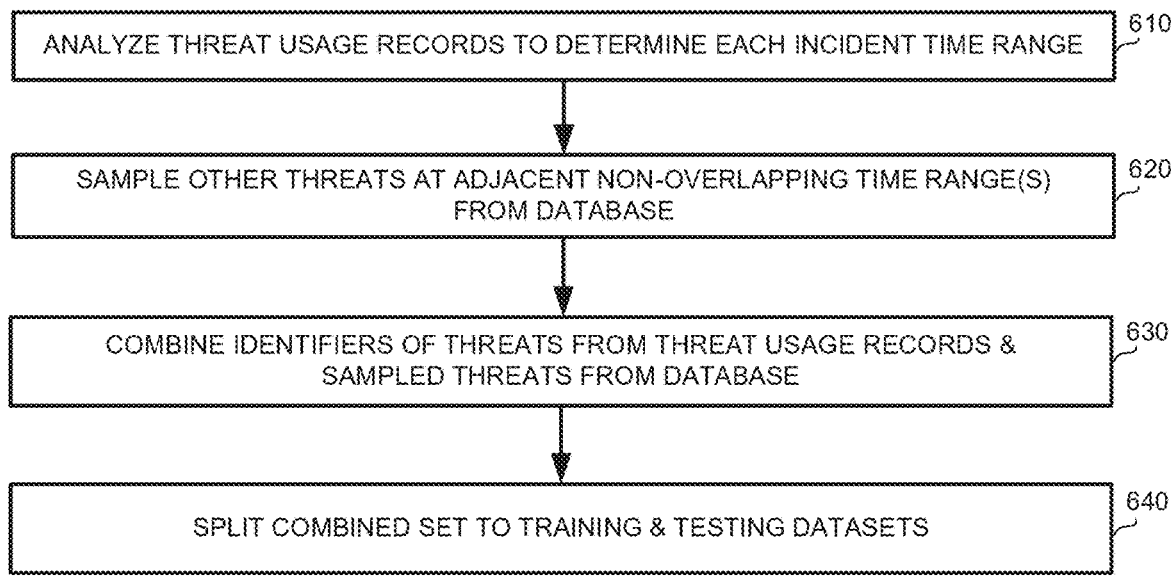
FIG. 6 is a flowchart diagram of a method for training dataset construction.

Reference is now made to FIG. 6, which is a flowchart diagram of a method for training dataset construction.

At 610 threat usage records such as 105 of FIG. 1 may be analyzed to determine time range(s) during which each incident of threat usage documented therein occurred. At 620 plurality of threats, different than the ones used in incidents documented in the threat usage records, and mapped to time range(s) adjacent to and non-overlapping with time range(s) determined at 610 may be sampled using threat events database such as 125 of FIG. 1.

Optionally time range mapping of sampled threats may be determined according to respective threat timelines thereof stored in 125. The adjacent non-overlapping time range(s), considered as "not exploited", i.e. time(s) at which no threat usage incidents occurred, may be obtained as complement of unity of time range(s) of incidents determined at 610. Optionally sampling of threats may be performed from or using threats directory, such as 550 of FIG. 5, CVE directory provided by MITRE, and/or the like.

At 630 identifiers of threats from incidents in threat usage records corresponding to time range(s) determined at 610 and of threats sampled at 620 may be combined. At 640 the combined set of threat identifiers of 630 may be split into training and testing datasets.

Figure 7:
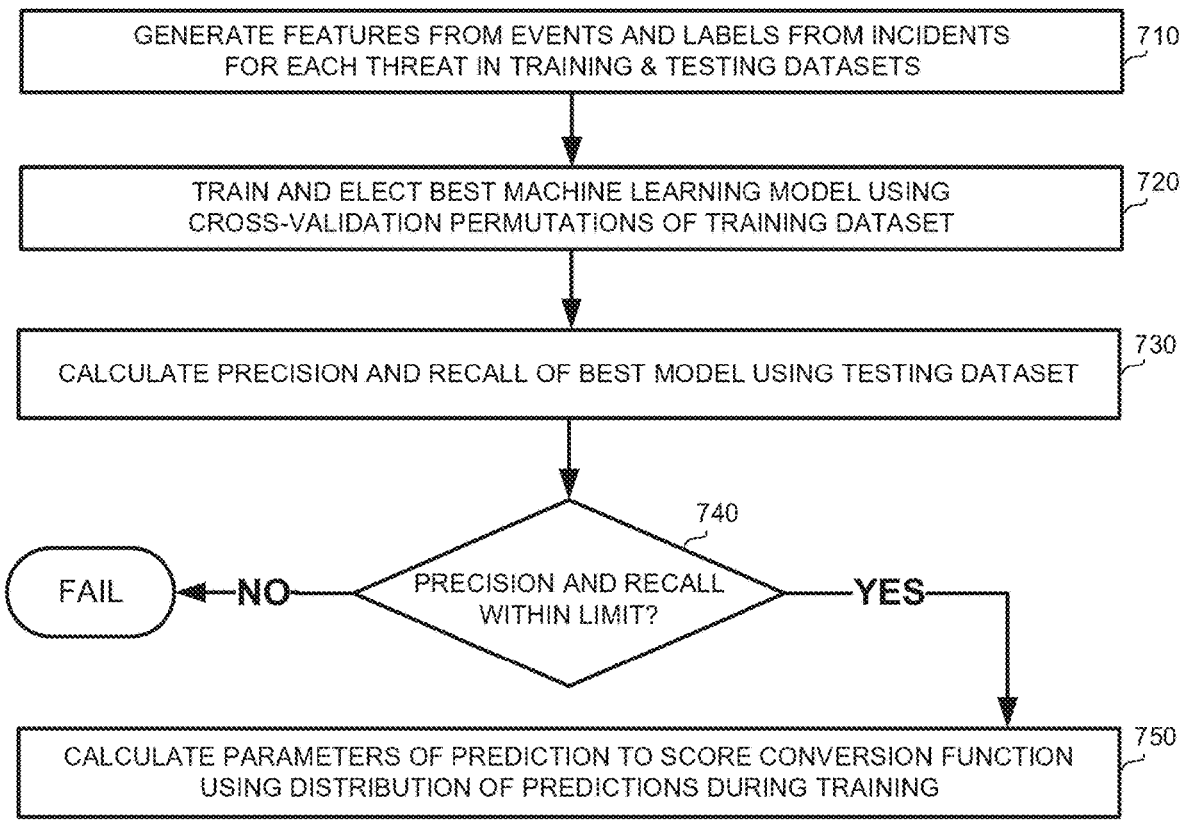
FIG. 7 is a flowchart diagram of a method for obtaining threat usage prediction model.

Reference is now made to FIG. 7, which is a flowchart diagram of a method for obtaining threat usage prediction model. Reference is also made to FIG. 8, which is a table of exemplary extracted features and labels.

At 710 features from events and labels from incidents may be generated for each threat in the training and testing datasets. The features and labels may be determined in accordance with type of threat usage prediction model trained, for example, prediction whether a threat may be expected to be exploited in recent incident, e.g. in past two weeks, in near future incident, e.g. within ten weeks, ever being exploited, and/or the like. Optionally generation of features may be performed by counting a total number of events from each class of events defined which occurred within range from a point in time when a prediction may be made. Similarly, generation of labels may be performed by counting a total number of incidents wherein a threat being used within corresponding time period. Exemplary features and labels such as may be generated at 710 are shown in the table depicted in FIG. 8.

Referring back to FIG. 7, at 720 at least one machine learning model may be trained for predicting threat usage using the training dataset with several cross-validation permutations, and the best model may be elected accordingly. At 730 precision and recall may be calculated for the best model using the testing dataset. At 740 a determination may be made as to whether the precision and recall calculated at 730 meet desired limits, otherwise the process may be ended. At 750 distribution of predictions during training may be used to calculate prediction to score conversion function parameters.

Figure 9:
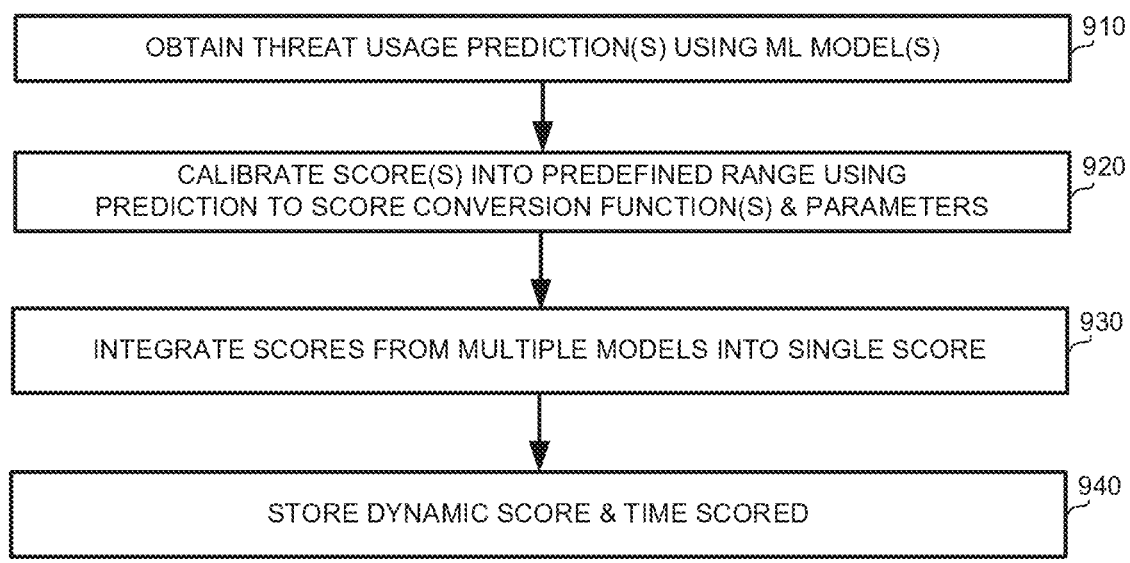
FIG. 9 is a flowchart diagram of a method for dynamic score calculation.

Reference is now made to FIG. 9, which is a flowchart diagram of a method for dynamic score calculation.

At 910 threat usage prediction(s) from machine learning model(s) such as 195 of FIG. 1 may be obtained. Such machine learning model(s) may generate, for each prediction, a numerical value that represents either a probability that threat exploit(s) may take place (for classification models) or an estimated 'average' number (i.e. mean or expected value) of threat exploit incidents (for regression models).

At 920 threat usage prediction(s) obtained at 910 may be converted to scores using corresponding prediction to score conversion function(s) of machine learning model(s) and parameters such as may be computed at 750 of FIG. 7. Exemplary conversion function may employ thresholding or binning of a prediction value into quantiles or non-regular intervals, e.g. predictions above predefined threshold may be considered as predictions that exploits take place with certainty, and/or the like.

From a user perspective, it may be expected or common to receive a score in the range of [0, 1] or [0, 10]. Calibration parameters generated during training of machine learning model(s) may be used by prediction to score conversion function(s) for calibrating score(s) into the range desired. A possible such calibration may be using a Sigmoid function when the prediction value which may be considered as the threshold for prediction may be mapped to the middle of the range. For example, value −4.0 of the sigmoid may be matched to quantile 0.05 for the "False" part and value+4.0 of the sigmoid may be matched to quantile 0.95 for the "True" part.

At 930 in case multiple prediction models being used, scores from all models as obtained at 920 may be integrated together into a single score, using weighted averaging, for example, or any other suitable aggregation scheme.

At 940 the dynamic score obtained at 930 may be stored in dynamic scores storage, optionally comprising current and past values of dynamic scores for each threat identified, using a score record comprising at least a threat identifier, the dynamic score value and the scoring time, e.g. the date and time in which the score being given. Optionally the dynamic scores storage may be comprised in or coupled to threat events database such as 125 of FIG. 1.

Figure 10:
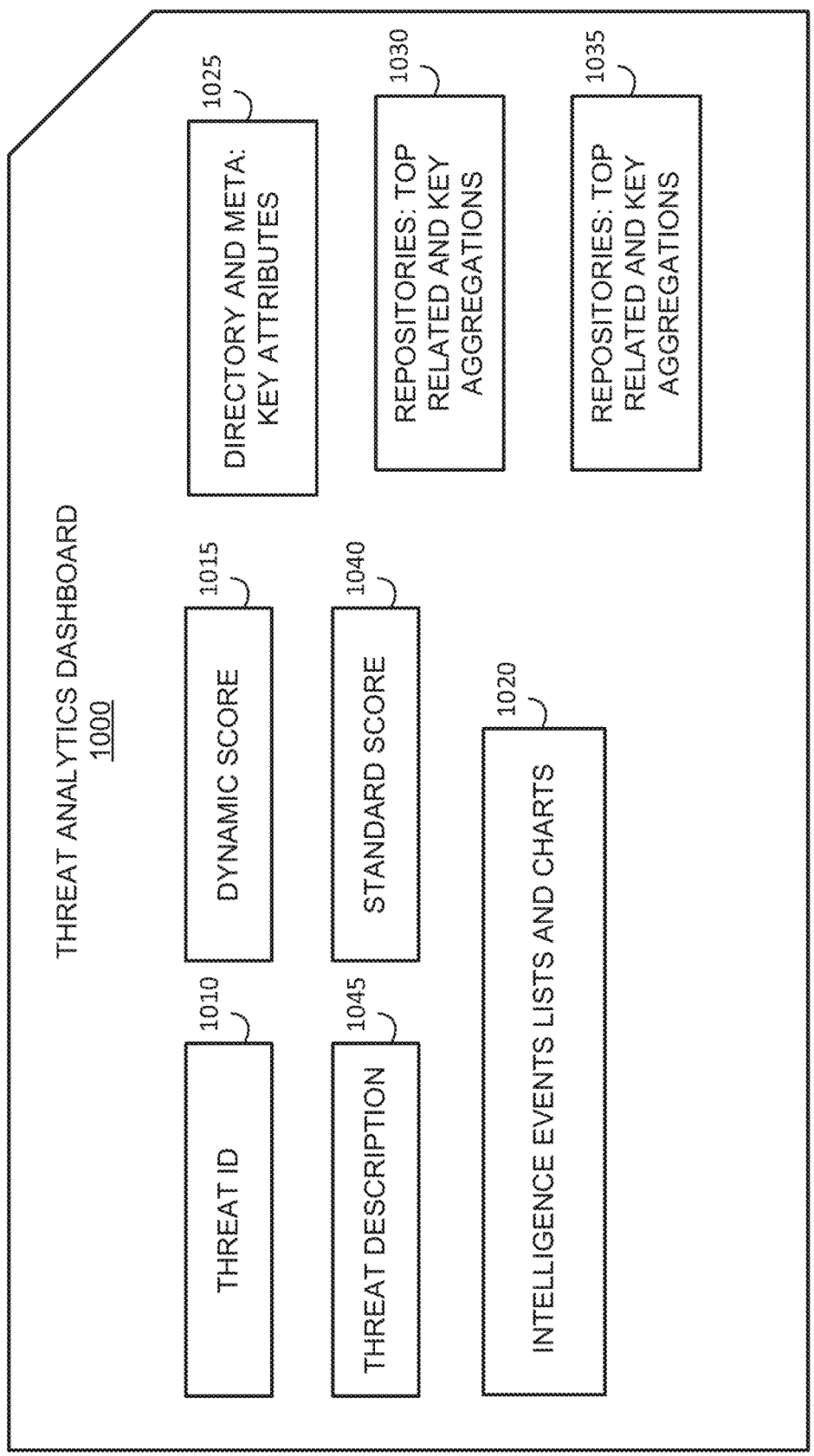
FIG. 10 is a block diagram of exemplary threats analytics dashboard.

Reference is now made to FIG. 10, which is a block diagram of exemplary threats analytics dashboard.

Threats analytics dashboard 1000 may be used for presenting threat-related information to users, such as top ranked threats report and/or the like, allowing users explore particular threats of their choice and retrieve stored data and/or analytics pertaining those threats, and/or the like.

Threats analytics dashboard 1000 may comprise a threat identifier (ID) 1010, such as a CVE ID assigned by MITRE organization to CVEs threats type, and/or likewise unique identifier widely accepted by relevant communities and practitioners. Optionally threat ID 1010 may also comprise identifier determined for threat or threat types with fuzzy identification such as malware and/or the like, as may be recorded in unified threats directory such as 550 of FIG. 5.

Additionally, threats analytics dashboard 1000 may comprise an actual current dynamic score 1015 and optionally as a reference, corresponding standard score 1040 such as NVD CVSS score or the like, which may be obtained from tracked data source(s) such as 100 of FIG. 1. Threats analytics dashboard 1000 may also comprise threat description 1045 in textual form, which may be based, for example, on one or more descriptions of the threat in tracked data source(s) such as threat directories and/or databases.

Threat analytics dashboard 1000 may display stored and processed data relating to threats as retained in data storage such as threat events database 125 of FIG. 1, for example, intelligence events lists and/or charts, comprising information regarding a threat going back to a time of its first detection may be visualized using time ordered list or chart and presented using 1020 and/or likewise feature.

Additionally or alternatively, other threat-related information items from tracked data sources of different types may be retrieved from storage and/or obtained otherwise and presented over threats analytics dashboard 1000. For example, key attributes of threat(s) and/or likewise items from threats directory and/or threats database, e.g., creation and update dates of related NVD record(s) and/or the like, may be presented using 1025 and/or likewise feature. Similarly, key metrics from threats code repositories, such as for example, first and last activity, number of repositories, watches count, forks count, commits count, top repositories, and/or the like may be gathered and presented using 1030 and/or likewise feature. Yet similarly, key chatter attributes such as for example first mention, last mention, total number of mentions, top actor, and/or the like may be gathered and presented using 1035.

In some embodiments, threats analytics dashboard 1000 may be used for presenting report on top threats based on dynamic scoring of an entire threats population calculated as described herein. Optionally such report may be filtered to address only threats which may be relevant to specific user, organization and/or target entity based on inventory of hardware and software components thereof, for example. Threat analytics dashboard 1000 may enable further exploration of information on threats by users for understanding reason and rationale of dynamic score of each, whether focusing on top threats reported and/or any other ones of interest. Optionally intermediate calculation results obtained during calculation of the dynamic score as displayed using 1015 may also be presented to users by threats analytics dashboard 1000, for example, the dynamic score in 1015 may be a weighted average of scores from a plurality of models predicting usage of a threat with respect to different time windows (e.g. a first model predicting usage of a threat at a time window in near future and/or recent past, and a second model predicting whether the threat was ever exploited), and one or more of the scores may be also made available via threats analytics dashboard 1000, for reference purposes or others.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant information security threats dynamic scoring systems and method will be developed and the scope of the term dynamic scoring is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for facilitating risk mitigation of information security threats, comprising:
   obtaining from at least one tracked data source a plurality of information items comprising information relating to a plurality of threats;
   for each of the plurality of threats identifying by analyzing the plurality of information items and storing in a database a plurality of events indicative of a usage likelihood of the threat and associated each with a date and time;
   generating from the plurality of events in the database for each of the plurality of threats and storing in the database a plurality of threat timelines each comprising a temporally ordered sequence of the plurality of events for a respective threat;
   for each of the plurality of threats and a plurality of time windows assigning labeling denoting threat usage in a respective one of the plurality of time windows using a plurality of incident records each documenting at least one threat usage incident of at least one of the plurality of threats;
   for each of the plurality of threat timelines extracting from the plurality of events a plurality of features;
   determining a correlation between the plurality of features extracted from the plurality of threat timelines and the labeling assigned, and selecting from the plurality of features a plurality of selected features based on the correlation;
   training at least one machine learning model for predicting threat usage in at least one time window using the plurality of selected features and labeling;
   for each of the plurality of threats calculating based on the plurality of selected features and storing in the database a dynamic score indicating an estimated level of risk posed by the threat using the at least one machine learning model; and
   for at least one of the plurality of threats outputting an indication of the dynamic score based on which risk mitigation according to the estimated level of risk being enabled.

2. The method of claim 1, wherein the analyzing further comprising classifying the plurality of events by an event classification, wherein the extracting of the plurality of features from the plurality of threat timelines being according to the event classification.

3. The method of claim 1, wherein training the at least one machine learning model comprising constructing a training set using the plurality of incident records, the constructing comprising: for at least one record of the plurality of incident records, determining at least one time window in which the at least one threat usage incident occurred, and sampling the plurality of threat timelines for obtaining and adding to the training set at least one threat timeline mapped to one or more adjacent non-overlapping time windows relative to the at least one time window at which no threat usage incidents occurred based on the plurality of incident records.

4. The method of claim 1, wherein calculating the dynamic score comprising using a plurality of machine learning models each being configured for providing prediction of threat usage during a different time window defined.

5. The method of claim 1, wherein analyzing the plurality of information items for identifying the plurality of events for each of the plurality of threats comprising: generating and storing at least one change record based on identified new or modified information item; and processing the at least one change record according to a defined set of rules for extracting event information therefrom.

6. The method of claim 1, wherein the at least one tracked data source being selected from the group consisting of: a threats directory; a threats updates feed; a threats database; a code repository; an exploit records collection; a threat-related text items collection; a sites collection; an actors collection.

7. The method of claim 1, further comprising repeatedly obtaining from the at least one tracked data source and analyzing another plurality of information items for identifying at least one other event than the plurality of events for each of the plurality of threats stored in the database and updating the database according to the at least one other event.

8. The method of claim 1, further comprising repeatedly recalculating the dynamic score within at least one time interval.

9. The method of claim 1, further comprising analyzing the plurality of events for identifying and storing in the database zero or more trend events added to a respective one of the plurality of threat timelines.

10. A system for facilitating risk mitigation of information security threats, comprising:
    a processing circuitry adapted to execute a code for:
       obtaining from at least one tracked data source a plurality of information items comprising information relating to a plurality of threats;
       for each of the plurality of threats identifying by analyzing the plurality of information items and storing in a database a plurality of events indicative of a usage likelihood of the threat and associated each with a date and time;

generating from the plurality of events in the database for each of the plurality of threats and storing in the database a plurality of threat timelines each comprising a temporally ordered sequence of each identified the plurality of events fora respective threat;

for each of the plurality of threats and a plurality of time windows assigning labeling denoting threat usage in a respective one of the plurality of time windows using a plurality of incident records each documenting at least one threat usage incident of at least one of the plurality of threats;

for each of the plurality of threat timelines extracting from the plurality of events a plurality of features;

determining a correlation between the plurality of features extracted from the plurality of threat timelines and labeling assigned, and selecting from the plurality of features a plurality of selected features based on the correlation;

training at least one machine learning model for predicting threat usage in at least one time window using the plurality of selected features and labeling;

for each of the plurality of threats calculating based on the plurality of selected features and storing in the database a dynamic score indicating an estimated level of risk posed by the threat using the at least one machine learning model; and for at least one of the plurality of threats outputting an indication of the dynamic score based on which risk mitigation according to the estimated level of risk being enabled.

11. The system of claim 10, wherein the analyzing further comprising classifying the plurality of events by an event classification, wherein the extracting of the plurality of features from the plurality of threat timelines being according to the event classification.

12. The system of claim 10, wherein training the at least one machine learning model comprising constructing a training set using the plurality of incident records, the constructing comprising: for at least one record of the plurality of incident records, determining at least one time window in which the at least one threat usage incident occurred, and sampling the plurality of threat timelines for obtaining and adding to the training set at least one threat timeline mapped to one or more adjacent non-overlapping time windows relative to the at least one time window at which no threat usage incidents occurred based on the plurality of incident records.

13. The system of claim 10, wherein calculating the dynamic score comprising using a plurality of machine learning models each being configured for providing prediction of threat usage during a different time window defined.

14. The system of claim 10, wherein analyzing the plurality of information items for identifying the plurality of events for each of the plurality of threats comprising: generating and storing at least one change record based on identified new or modified information item; and processing the at least one change record according to a defined set of rules for extracting event information therefrom.

15. The system of claim 10, wherein the at least one tracked data source being selected from the group consisting of: a threats directory; a threats updates feed; a threats database; a code repository; an exploit records collection; a threat-related text items collection; a sites collection; an actors collection.

16. A computer program product for facilitating risk mitigation of information security threats, comprising:

a non-transitory computer readable storage medium;

program instructions for executing, by a processor, a method comprising:

obtaining from at least one tracked data source a plurality of information items comprising information relating to a plurality of threats;

for each of the plurality of threats identifying by analyzing the plurality of information items and storing in a database a plurality of events indicative of a usage likelihood of the threat and associated each with a date and time;

generating from the plurality of events in the database for each of the plurality of threats and storing in the database a plurality of threat timelines each comprising a temporally ordered sequence of the plurality of events for a respective threat;

for each of the plurality of threats and a plurality of time windows assigning labeling denoting threat usage in a respective one of the plurality of time windows using a plurality of incident records each documenting at least one threat usage incident of at least one of the plurality of threats;

for each of the plurality of threat timelines extracting from the plurality of events a plurality of features;

determining a correlation between the plurality of features extracted from the plurality of threat timelines and labeling assigned, and selecting from the plurality of features a plurality of selected features based on the correlation;

training at least one machine learning model for predicting threat usage in at least one time window using the plurality of selected features and labeling;

for each of the plurality of threats calculating based on the plurality of selected features and storing in the database a dynamic score indicating an estimated level of risk posed by the threat using the at least one machine learning model; and for at least one of the plurality of threats outputting an indication of the dynamic score based on which risk mitigation according to the estimated level of risk being enabled.

17. The computer program product of claim 16, wherein the analyzing further comprising classifying the plurality of events by an event classification, wherein the extracting of the plurality of features from the plurality of threat timelines being according to the event classification.

18. The computer program product of claim 16, wherein training the at least one machine learning model comprising constructing a training set using the plurality of incident records, the constructing comprising: for at least one record of the plurality of incident records, determining at least one time window in which the at least one threat usage incident occurred, and sampling the plurality of threat timelines for obtaining and adding to the training set at least one threat timeline mapped to one or more adjacent non-overlapping time windows relative to the at least one time window at which no threat usage incidents occurred based on the plurality of incident records.

19. The computer program product of claim 16, wherein calculating the dynamic score comprising using a plurality of machine learning models each being configured for providing prediction of threat usage during a different time window defined.

20. The computer program product of claim 16, wherein analyzing the plurality of information items for identifying the plurality of events for each of the plurality of threats comprising: generating and storing at least one change record based on identified new or modified information item; and processing the at least one change record according to a defined set of rules for extracting event information therefrom.

* * * * *